United States Patent [19]

Tanaka et al.

[11] Patent Number: 4,457,525
[45] Date of Patent: Jul. 3, 1984

[54] VEHICLE BODY FLOOR CONSTRUCTION OF MOTOR VEHICLES

[75] Inventors: Yasushi Tanaka; Shigeru Mariya, both of Toyota, Japan

[73] Assignee: Toyota Jidosha Kogyo Kabushiki Kaisha, Aichi, Japan

[21] Appl. No.: 387,369

[22] Filed: Jun. 11, 1982

[30] Foreign Application Priority Data

Jun. 12, 1981 [JP] Japan .................. 56-86602[U]

[51] Int. Cl.³ .......................................... B60K 15/02
[52] U.S. Cl. ................................................ 280/5 A
[58] Field of Search .............. 280/5 A, 5 R; 296/208, 296/204; 180/89.1, 314

[56] References Cited

U.S. PATENT DOCUMENTS 3,285,359  11/1966  Weeks et al. .................. 280/5 A Primary Examiner—Robert R. Song
Attorney, Agent, or Firm—Parkhurst & Oliff

[57] ABSTRACT

A vehicle body floor construction of a motor vehicle, wherein a tunnel upwardly projecting from the surface of a floor panel, downwardly opening and disposed in the longitudinal direction of the vehicle is formed at the central portion in the widthwise direction of the floor panel, a fuel tank is disposed in the tunnel, and a protector is disposed in a manner to block the bottom opening of the tunnel at least within a range of the fuel tank and connected to the floor panel at opposite sides of the opening.

10 Claims, 3 Drawing Figures

VEHICLE BODY FLOOR CONSTRUCTION OF MOTOR VEHICLES

BACKGROUND OF THE INVENTION

1. Field of the Invention

This invention relates to a vehicle body floor construction of a motor vehicle wherein a tunnel upwardly projecting from the surface of a floor panel, downwardly opening and disposed in the longitudinal direction of the vehicle is formed at the central portion in the widthwise direction of the floor panel and a fuel tank is disposed in the tunnel.

2. Description of the Prior Art

In general, in a motor vehicle, particularly, a passenger vehicle, a fuel tank has been disposed at the back of seats located at the rear end of a space occupied by occupants, whereby there have been imposed limits on the utilization of a space in the rear portion of the veicle by the space occupied by the fuel tank.

To solve the above-described problems, it is conceivable that, in a rear engine-rear wheel drive type motor vehicle, a front engine-front wheel drive type motor vehicle or the like M (Refer to FIG. 1), in which a drive shaft does not longitudinally traverse a floor panel of the vehicle therebeneath, a tunnel 2 upwardly projecting from the surface of the floor panel and disposed in the longitudinal direction of the vehicle is formed at the central portion in the widthwise direction of the floor panel 1, and a fuel tank 3 is disposed in the tunnel 2, so that effective utilization of the space in the rear portion of the vehicle can be enhanced and further reduce total length of the vehicle and decreased weight of the vehicle can be attained.

In the drawing, reference numeral E designates an engine, W a wheel and S a passenger seat, respectively.

In the case of a motor vehicle having the above-described construction, the fuel tank 3 is disposed at the undersurface of the central portion of the floor panel 1, and hence, it is necessary to protect the fuel tank against a rock sent flying by a tire during running of the vehicle, or the curb stone or an obstacle onto which the motor vehicle runs during running. Particularly, when the fuel tank is made of a vulnerable material such as synthetic resin, necessity for protection is high in degree. Furthermore, occurrece of irregularities on the undersurface of the floor panel 1 may lead to a danger of an increased air resistance during running of the motor vehicle, and hence, in order to remedy it, it is necessary to smooth the undersurface of the floor panel 1.

Furthermore, the fuel tank is apt to be influenced by the vibrations during running of the motor vehicle, and hence, must be stably supported in the tunnel against forces acting thereon in the vertical, lateral and/or longitudinal direction.

SUMMARY OF THE INVENTION

It is therefore an object of the present invention to provide a vehicle body floor construction of a motor vehicle, wherein, in the motor vehicle having the above-described construction, a fuel tank is protected against a flying rock or an obstacle and the undersurface of a floor of the motor vehicle is smoothed.

Furthermore, another object of the present invention is to provide a vehicle body floor construction of a motor vehicle capable of stably supporting the fuel tank within the tunnel in the motor vehicle having the above-described construction.

Further, a further object of the present invention is to provide a vehicle body floor construction for facilitating work of assembling the fuel tank in the motor vehicle having the above-described construction.

To achieve one of the above-described objects, according to the present invention, a tunnel upwardly projecting form the surface of a floor panel, downwardly opening and disposed in the longitudinal direction of the vehicle is formed at the central portion in the widthwise direction of the floor panel, a fuel tank is disposed in the tunnel, and a protector is disposed in a manner to block the bottom opening of the tunnel at least within a range of the fuel tank and connected to the floor panel at opposite sides of the opening.

To achieve one of the above-described objects, according to the present invention, the aforesaid protector has a length to block the bottom opening of the tunnel over the total length thereof in the above-described vehicle body floor construction of a motor vehicle.

Further, to achieve one of the above-described objects, according to the present invention, in the vehicle body floor construction of the motor vehicle as described above, the protector is provided with erected portions projecting into the tunnel at least in front or at the back of the fuel tank for protecting at least the forward or rear face of the fuel tank.

Further, to achieve one of the above-described objects, according to the present invention, the aforesaid protector upwardly clamps and solidly secures the fuel tank in a manner to urge a shock absorbing material interposed between the inner side surface of the tunnel and the upper and side surfaces of the fuel tank in the above-described vehicle body floor construction of a motor vehicle.

Furthermore, to achieve one of the above-described objects, according to the present invention, the aforesaid fuel tank is previously mounted on the protector and the aforesaid protector is secured to the floor panel, whereby the fuel tank is disposed in the tunnel in the above-described vehicle body floor construction of a motor vehicle.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Figure 1:
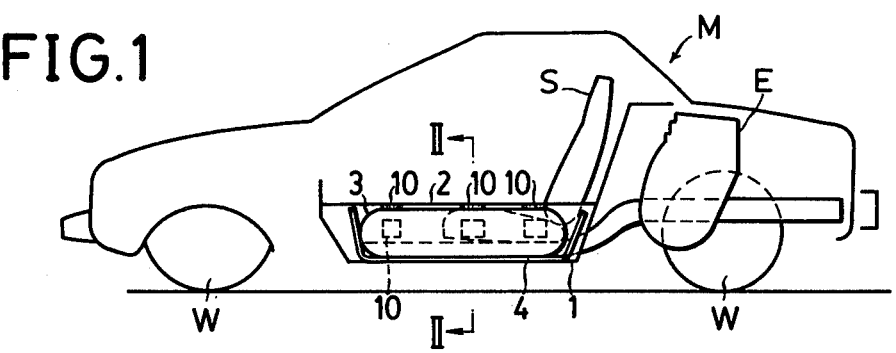
FIG. 1 is a schematic sectional view showing the motor vehicle to which the present invention is to be applied.

Detailed description will hereunder be given of the embodiments of the present invention with reference to the drawings.

As shown in the drawing, in this embodiment, a protector 4 is provided for blocking the bottom opening of the tunnel 2, in which the fuel tank 3 is disposed.

More specifically, the protector 4 traverses the fuel tank 3 disposed in the tunnel 2 therebeneath, and is integrally connected at the widthwise opposite ends thereof to the floor panel 1 by means of bolts 5 and nuts 6 at opposite sides of the bottom opening of the aforesaid tunnel 2.

In consequence, the fuel tank 3 is disposed in a closed cross-section 7 formed by the protector 4 and the tunnel 2.

Figure 3:
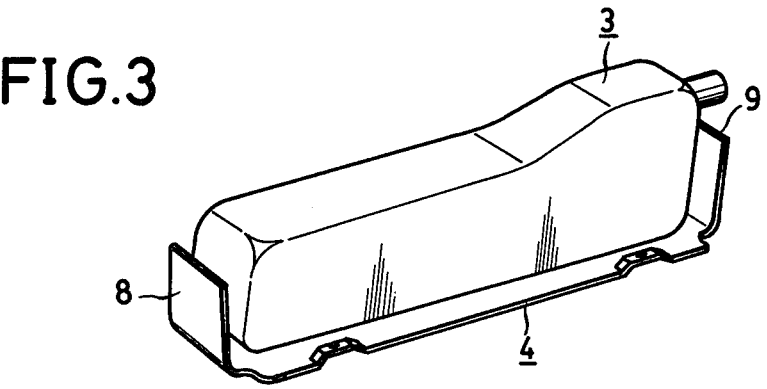
FIG. 3 is a perspective view showing the protector and the fuel tank in the above-mentioned embodiment.

Erected portions 8 and 9 are integrally formed at the forward and rear ends of the protector 4, respectively. These erected portions 8 and 9 are each formed to have a width and a height allowing the protector 4 to enter the interior of the tunnel 2 in the state where the protector 4 is secured to the floor panel 1, protecting the forward and rear faces of the fuel tank 3 as shown in FIG. 3.

Figure 2:
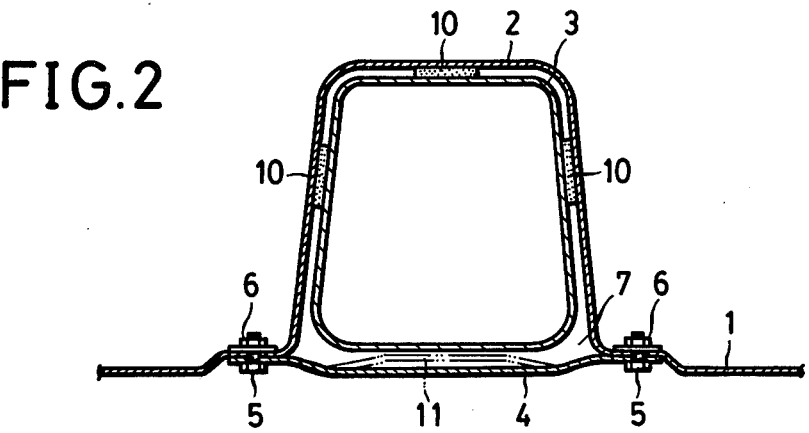
FIG. 2 is an enlarged sectional view corresponding to the portions taken along the line II—II in FIG. 1, showing the vehicle body floor construction of the motor vehicle according to the present invention.

Reference numeral 10 in FIG. 2 indicates shock absorbing materials disposed between the upper and opposite side surface of the fuel tank 3 and the inner peripheral surface of the tunnel 2, and the fuel tank 3 is stably supported in the tunnel 2 by pushing the shock absorbing materials, when it is tightened upwardly by the protector 4 through a resilient member 11.

In the case of the above-described embodiment, in addition to the protection of the fuel tank 3 and the decrease in the air resistance, both the fuel tank 3 and the protector 4 can be assembled into the tunnel 2 in the state where the fuel tank 3 is previously mounted on the protector 4, and hence, the advantage of easy assembling work can be offered.

In addition, in the above-described embodiment, the protector 4 is provided with the erected portions 8 and 9 for protecting the forward and rear end faces of the fuel tank 3, however, when the fuel tank 3 is sufficiently long in the longitudinal direction of the vehicle and the forward and rear end faces thereof closely face the end portions of the tunnel 2, either one or both of the erected portions 8 can be dispensed with because there is no necessity for protecting the forward and rear end faces thereof.

Furthermore, when the tunnel 2 is longer by a predetermined value than the length of the fuel tank 3, the length of the protector 4 may be within a range capable of protecting the fuel tank 3. However, in order to decrease the air force resistance, it is desirable to provide the protector 4 covering the total length of the tunnel 2.

It should be apparent of those skilled in the art that the abovedescribed embodiment is merely representative, which represents the appilications of the principles of the present invention. Numerous and varied other arrangements can be readily devised by those skilled in the art without departing from the spirit and the scope of the invention.

What is claimed is:

1. A vehicle body floor construction of a motor vehicle, wherein a tunnel upwardly projecting from the surface of a floor panel, downwardly opening and disposed in the longitudinal direction of the vehicle is formed at the central portion in the widthwise direction of said floor panel, a fuel tank is disposed in said tunnel, and a protector is disposed in a manner to block the bottom opening of said tunnel at least within a range of the fuel tank and connected to said floor panel at opposite sides of said opening.

2. A vehicle body floor construction of a motor vehicle as set forth in claim 1, wherein said protector has a length to block the bottom opening of said tunnel over the total length thereof.

3. A vehicle body floor construction of a motor vehicle as set forth in claim 1, wherein said protector is integrally provided with erected portions projecting into said tunnel at least in front or at the back of said fuel tank for protecting at least the forward or rear face of said fuel tank.

4. A vehicle body floor construction of a motor vehicle as set forth in claim 1, 2 or 3, wherein said protector upwardly clamps and solidly secures said fuel tank in a manner to urge a shock absorbing material interposed between the inner side surface of the tunnel and the upper and side surfaces of said fuel tank.

5. A vehicle body floor construction of a motor vehicle as set forth in claim 1, 2 or 3, wherein said fuel tank is previously mounted on said protector and said protector is secured to said floor panel, whereby said fuel tank is disposed in said tunnel.

6. A vehicle body floor construction of a motor vehicle as set forth in claim 4, wherein said fuel tank is previously mounted on said protector and said protector is secured to said floor panel, whereby said fuel tank is disposed in said tunnel.

7. In a motor vehicle having a longitudinal direction and a floor panel coupled within said motor vehicle, the improvement in said floor panel comprising:
said floor panel having an upwardly projecting central portion forming a tunnel extending in the longitudinal direction of the vehicle and opening downwardly from said floor panel;
a fuel tank disposed in a portion of said tunnel; and
a protection member disposed beneath said fuel tank and coupled to said floor panel in such a member as to close the tunnel opening along the entire length of that portion of the tunnel in which said fuel tank is disposed.

8. The vehicle of claim 7 wherein said protection member has a length which closes the tunnel opening over the entire length of the tunnel.

9. The vehicle of claim 7 wherein said protection member includes first and second end portions integrally coupled at opposite ends of said protection member and extending within said tunnel, said fuel tank having a forward face and a rear face within said tunnel and said first and second end portions being constructed and arranged to cover said forward and rear faces to protect said fuel tank.

10. The vehicle of claim 7 further comprising a shock absorbing material interposed between surfaces of said fuel tank and surfaces of said central portion forming said tunnel and further wherein said protection member is coupled to said floor panel to upwardly clamp said fuel tank into engagement with said interposed shock absorbing materials.

* * * * *